(12) United States Patent
Lahijani

(10) Patent No.: US 8,378,030 B2
(45) Date of Patent: Feb. 19, 2013

(54) FLEX LIFE OF TETRAFLUOROETHYLENE/PERFLUORO (ALKYL VINYL ETHER) COPOLYMER (PFA)

(75) Inventor: Jacob Lahijani, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/193,683

(22) Filed: Jul. 29, 2011

(65) Prior Publication Data

US 2012/0035326 A1    Feb. 9, 2012

Related U.S. Application Data

(60) Provisional application No. 61/371,270, filed on Aug. 6, 2010.

(51) Int. Cl.
*C08L 27/12* (2006.01)
*C08F 214/26* (2006.01)
(52) U.S. Cl. ..................... 525/199; 525/200
(58) Field of Classification Search .......... 525/199, 525/200
See application file for complete search history.

(56) References Cited

U.S. PATENT DOCUMENTS

| | | | |
|---|---|---|---|
| 3,635,926 A | 1/1972 | Gresham et al. | |
| 4,029,865 A | 6/1977 | Varglu et al. | |
| 4,624,990 A | 11/1986 | Lunk et al. | |
| 4,743,658 A | 5/1988 | Imbalzano et al. | |
| 4,859,836 A | 8/1989 | Lunk et al. | |
| 5,317,061 A | 5/1994 | Chu et al. | |
| 5,473,018 A | 12/1995 | Namura et al. | |
| 5,603,999 A | 2/1997 | Namura et al. | |
| 5,677,404 A | 10/1997 | Blair | |
| 5,932,673 A | 8/1999 | Aten et al. | |
| 6,436,533 B1 | 8/2002 | Heffner et al. | |
| 6,465,575 B1 | 10/2002 | Kusano et al. | |
| 6,583,226 B1 | 6/2003 | Kaulbach et al. | |
| 6,649,699 B2 | 11/2003 | Namura | |
| 6,838,545 B2 | 1/2005 | Chapman et al. | |
| 7,030,191 B2 | 4/2006 | Namura | |
| 7,947,775 B2 * | 5/2011 | Venkataraman et al. | 524/501 |
| 8,053,527 B2 * | 11/2011 | Burch et al. | 525/199 |
| 2007/0106026 A1 | 5/2007 | Namura | |
| 2007/0106027 A1 | 5/2007 | Namura | |
| 2009/0317553 A1 | 12/2009 | Harvey et al. | |
| 2010/0080955 A1 | 4/2010 | Harvey et al. | |
| 2010/0080959 A1 | 4/2010 | Harvey et al. | |

FOREIGN PATENT DOCUMENTS

WO    2011075351 A1    6/2011

OTHER PUBLICATIONS

Scigala, R., et al, "Crystallinity of Poly(Tetrafluoroethylene)," Acta Polymerica 40, No. 1, 15-19 (1989).
Ferry, L., et al, "Study of Polytetrafluoroethylene Crystallization," Acta Polymer, 46, 300-306 (1995).
Lee, J-C, et al, "Miscibility and Cocrystallization Behavior of Two Melt-Processable Random Copolymers of Tetrafluoroethylene and Perfluoroalkylvinylether," Polymer 42 (2001) 5453-5461.
Pucciariello, R., et al, "Phase Behavior of Crystalline Blends of Poly(Tetrafluoroethylene) and of Random Fluorinated Copolymers of Tetrafluoroethylene," Journal of Polymer Science: Part B: Polymer Physics, vol. 37, 679-689 (1999), John Wiley & Sons, Inc.
Endo, M., et al, "Miscibility and Crystallization of Polytetrafluoroethylene/ Poly(Tetrafluoroethylene-Co-Perfluoropropylvinyl Ether) Blends," Macromol. Rapid Commun. 21, No. 7, 396-400, Wiley-VCH Verlag GMBH, D-69451 Weinheim 2000.
Runt, J., et al, "Crystalline Homopolymer—Copolymer Blends: Poly(Tetrafluoroethylene)—Poly(Tetrafluoroethylene-Co-Perfluoroalkylvinyl Ether)," Macromolecules 1995, 28, 2781-2786.
Marigo, A., et al, "Annealed Samples of Some Tetrafluoroethylene Perfluorinated Copolymers Studied by Small- and Wide-Angle X-Ray Scattering and Differential Scanning Calorimetry," Macromolecules 1997, 30, 7862-7865.
Endo, M., et al, "Crystallization in Binary Blends of Polytetrafluoroethylene With Perfluorinated Tetrafluoroethylene Copolymer," Polymer Journa, vol. 36, No. 9, pp. 716-727 (2004).
Ebnesajjad, S., "Fluoroplastics, Volume 2: Melt Processible Fluoropolymers the Definitive User's Guide and Databook," Plastics Design Library, A Division of William Andrew Inc., Norwich, NY, p. 6, pp. 125-128 and pp. 133-134 (2003).
Klug, Harold, "X-Ray Diffraction Procedures for Polycrystalline and Amorphous Materials," John Wiley & Sons, Inc., New York, p. 491, (1954).
Lahijani, J., "Downhole Well Communications Cable," Unpublished U.S. Appl. No. 13/193,672, filed Jul. 29, 2011, E. I. Du Pont De Nemours and Company.
Lahijani, J., "Melt-Fabricable Perfluoropolymers Having Improved Heat Aging Property," Unpublished U.S. Appl. No. 13/193,676, filed Jul. 29, 2011, E. I. Du Pont De Nemours and Company.

* cited by examiner

*Primary Examiner* — Nathan M Nutter

(57) ABSTRACT

A process is provided for improving the MIT flex life of tetrafluoroethylene/perfluoro(alkyl vinyl ether) copolymer, said perfluoroalkyl containing from 1 to 5 carbon atoms, comprising incorporating melt flowable polytetrafluoroethylene into said copolymer and thereafter heat treating the resultant composition at a temperature of at least 280° C., the amount of said polytetrafluoroethylene and said heat treatment being effective to increase the flex life of said composition by at least 2× the flex life of both said copolymer and said composition prior to said heat treatment and to thermally transform the composition in the solid state, which is epitaxial co-crystallization of the polymer components of the composition.

14 Claims, No Drawings

FLEX LIFE OF TETRAFLUOROETHYLENE/PERFLUORO (ALKYL VINYL ETHER) COPOLYMER (PFA)

FIELD OF INVENTION

This invention relates to a process for improving the flex life of PFA.

BACKGROUND OF INVENTION

Namura et al., U.S. Pat. No. 5,473,018 discloses the addition of polytetrafluoroethylene having a heat of crystallization of at least 50 J/g to PFA to increase the surface smoothness of the PFA. '018 characterizes this polytetrafluoroethylene as being low in molecular weight in contrast to polytetrafluoroethylene molding powder that has a low heat of crystallization and a molecular weight of several million, enabling the latter to be molded compression premolded/sintered or paste extrusion/sintered. In addition to reporting surface smoothness, '018 reports the effect of the low molecular weight polytetrafluoroethylene on the flex life (folding endurance) of the resultant composition depending on the amount of this component in the PFA-containing composition as follows: increase in flex life up to 5 wt %, decline in flex life at 10 wt %, and sharp decline at 20 wt % (Table 3), sharp declines at 10 wt % (Table 4) and sharp declines at just 5 wt %.

Namura, in later patents, U.S. Pat. Nos. 6,649,669 and 7,030,191, addresses this shortcoming in flex life by certain requirements for the PFA component and the low molecular weight polytetrafluoroethylene component. '669 requires that the perfluoro(alkyl vinyl ether) content of the PFA be at least 4 wt %, preferably 5 to 20 wt %, and the melt flow rate (MFR) of the PFA be no greater than 4 g/10 min, and the amount of the low molecular weight polytetrafluoroethylene be 5 to 30 wt %. In Tables 1 and 2, the peak flex life is at 10 wt % of this component. '191 discloses further improvement when the MFR of the PFA is 0.1 to 1.7 g/10 min, the perfluoro (alkyl vinyl ether content of the PFA is 5 to 10 wt %, preferably 6 to 10 wt %, and the amount of low molecular weight polytetrafluoroethylene in the composition is 30 to 55 wt %. Table 1 discloses the profound effect of PFA MFR on flex life, viz. as the MFR increases from 1.6 to 11.9 g/10 min the flex life decreases by 95%.

Low MFR of the PFA means that the PFA has low fluidity (high melt viscosity) in the molten state required for melt fabrication than high MFR PFA. Low fluidity, low MFR PFA is more difficult to melt fabricate than high fluidity, high MFR PFA. The problem is how to improve the flex life of PFA without the limitation that the PFA must have a low MFR, no greater than 4 g/10 min ('669) or no greater than 1.7 g/10 min ('191).

SUMMARY OF INVENTION

The present invention solves this problem by heat treating the PFA/low molecular weight polytetrafluoroethylene composition, whereby the improvement in flex life (MIT flex life) is not limited to low MFR PFA as in the prior art. Thus, one embodiment of the present invention can be defined as a process for improving the MIT flex life of tetrafluoroethylene/perfluoro(alkyl vinyl ether) copolymer, said perfluoroalkyl containing from 1 to 5 carbon atoms, comprising incorporating melt flowable polytetrafluoroethylene into said copolymer and thereafter heat treating the resultant composition in a solid state at a temperature of at least 280° C., the amount of said polytetrafluoroethylene and said heat treatment being effective to increase the flex life of said composition by at least two times (2×) the flex life of said copolymer by itself prior to said heat treatment.

Another embodiment of the present invention can also be defined as a process for improving the MIT flex life of a composition comprising tetrafluoroethylene/perfluoro(alkyl vinyl ether) copolymer, said perfluoroalkyl containing from 1 to 5 carbon atoms, and melt flowable polytetrafluoroethylene, said process comprising heat treating said composition in the solid state at a temperature of at least 280° C., the amount of said polytetrafluoroethylene in said composition and said heat treatment being effective to improved the flex life of said composition by at least 2× the flex life of said composition prior to said heat treatment. The longer the heat treatment, the greater the increase in MIT flex life, e.g. at least 5× or at least 8× the MIT flex life of the composition prior to heat treatment. The same magnitude of improvement is obtained as compared to the unaged copolymer by itself.

Preferably, for both of these embodiments: (a) the amount of said melt flowable polytetrafluoroethylene can be 15 to 35 wt % based on the total weight of the composition; (b) the heat treatment can be carried out at for at least 24 hr; (c) the heat treatment can be carried out at a temperature of at least 300° C. for at least 2 days; (d) the heat treatment is effective to produce epitaxial co-crystallization as described in Example 3; (e) the effect of the incorporation of said polytetrafluoroethylene into said copolymer on said flex life prior to said heat treatment can be to decrease said flex life of said composition; and/or (e) the composition is melt fabricated into an article and it is said article that is subjected to said heat treatment. These embodiments can be applied separately or in any combination.

DETAILED DESCRIPTION OF INVENTION

The tetrafluoroethylene/perfluoro(alkyl vinyl ether) copolymer (PFA) used in the present invention is melt flowable so as to be melt fabricable. By melt fabricable is meant that the PFA is sufficiently flowable in the molten state that it can be fabricated by melt processing such as extrusion or injection molding to produce products having sufficient strength so as to be useful. This sufficient strength can be characterized by the PFA by itself exhibiting an MIT Flex Life of at least 1000 cycles, preferably at least 2000 cycles using 8 mil (0.21 mm) thick film. In the MIT Flex Life test, the film is gripped between jaws and is flexed back and forth over a 135° range. In this case, the strength of the PFA is indicated by it not being brittle. The PFA used in the present invention is a fluoroplastic, not a fluoroelastomer. As a fluoroplastic, the PFA is semicrystalline, also called partially crystalline. The melt flow rate (MFR) of the PFA prior to any heat treatment of the PFA/LMW PTFE composition or article made therefrom is at least 0.1 g/10 min, preferably at least 5 g/10 min, more preferably at least 6 g/10 min and no greater than 50 g/10 min, preferably no greater than 40 g/10 min, all as measured using the extrusion plastometer described in ASTM D-1238 under the conditions disclosed in ASTM D 3307, i.e. wherein the melt temperature is 372° C. and the load on the melt is 5 kg.

PFA is a copolymer of tetrafluoroethylene (TFE) and perfluoro(alkyl vinyl ether) (PAVE) in which the perfluoroalkyl group, linear or branched, contains 1 to 5 carbon atoms. Preferred PAVE monomers are those in which the perfluoroalkyl group contains 1, 2, 3 or 4 carbon atoms, respectively known as perfluoro(methyl vinyl ether) (PMVE), perfluoro (ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer, but included as PFA herein. The PFA may contain about 1-15 wt % PAVE, although for a PAVE content of 2 to 5 wt % is the most common PAVE content when a single PAVE monomer is used to form the PFA, the TFE forming the remainder of the copolymer. When PAVE includes PMVE, the composition is about 0.5-13 wt % perfluoro(methyl vinyl ether) and about 0.5 to 3 wt % PPVE, the remainder to total 100 wt % being TFE. Preferably, the identity and amount of PAVE present in the PFA is such that the melting temperature of the PFA is greater than 300° C. Examples of PFA are disclosed in U.S. Pat. Nos. 3,635,926 (Carlson) and 5,932,673 (Aten et al.).

The PFA used in the present invention is preferably not fluorine treated to replace unstable end groups arising from aqueous dispersion polymerization to form the PFA by the stable end group —$CF_3$. Unstable end groups are those that undergo chemical change during the melt fabrication of the PFA, such end groups most commonly being —$CONH_2$, —COF, —$CH_2OH$, and —COOH. Thus, the PFA used in the present invention the PFA has one or more of the unstable end groups mentioned above arising from aqueous dispersion polymerization to form the PFA.

The polytetrafluoroethylene used in the present invention is melt flowable as a result of its low molecular weight polymer, whereby this polymer is referred to as LMW PTFE herein. This low molecular weight is in contrast to PTFE, which is non-melt flowable in the molten state, arising from its extremely high molecular weight. While this low molecular weight of the LMW PTFE gives it melt flowability, the LMW PTFE by itself is not melt fabricable, i.e. an article molded from the melt of LMW PTFE is useless, by virtue of extreme brittleness. Because of its low molecular weight (relative to non-melt-flowable PTFE), it has no strength. An extruded filament of this low molecular weight (LMW) PTFE is so brittle that it breaks upon flexing. Generally, compression molded plaques cannot be made for flex testing of the LMW PTFE used in the present invention, because the plaques crack or crumble when removed from the compression mold, MIT Flex Life can not be tested. In effect, this LMW PTFE has an MIT Flex Life of zero cycles and a tensile strength of zero.

The LMW PTFE can also be characterized by high crystallinity, preferably exhibiting a heat of crystallization of at least 50 J/g.

In addition to the LMW PTFE being characterized by its high crystallinity and lack of strength, the preferred LMW PTFE has melt flowability, which for example can be characterized by a melt flow rate (MFR) of at least 0.01 g/10 min, preferably at least 0.1 g/10 min and more preferably at least 5 g/10 min, and still more preferably at least 10 g/10 min, as measured in accordance with ASTM D 1238, at 372° C. using a 5 kg weight on the molten polymer.

The MFR of the PFA and LMW PTFE used in the compositions to be heat treated according to the present invention are preferably within the ranges of 20 g/10 min from each other, preferably 15 g/10 min and more preferably 10 g/10 min from each other, as determined by the ASTM D 1238 conditions mentioned above. The melt flow rates disclosed herein are determined on non-heat-treated polymer unless otherwise indicated.

LMW PTFE is obtained by either direct polymerization under conditions that prevent very long polymer chains from forming, or by irradiation degradation of PTFE, i.e. the high molecular weight, non-melt flowable PTFE. While the LMW PTFE has low molecular weight, it nevertheless has sufficient molecular weight to be solid up to high temperatures, e.g. at least 300° C., more preferably at least 310° C., even more preferably, at least 320° C. According to one embodiment, one indicator of this sufficient molecular weight is that the LMW PTFE forms a viscous melt, such that when the polymer is subjected to the MFR determination in accordance with ASTM D 1238 at 372° C., using a 5 kg weight, the MFR of the polymer is preferably no greater than 100 g/10 min, preferably no greater than 75 g/10 min, even more preferably, no greater than 50 g/10 min. Each of these highest MFR amounts can be combined with any of the lowest MFRs mentioned above to form MFR ranges, e.g. 0.01-50 g/10 min, 0.01-75 g/10 min, 10-50 g/10 min, etc.

The LMW PTFE used in the present invention is frequently called PTFE micropowder, which is also another way of distinguishing this polymer from the high molecular weight, non-melt flowable PTFE. The trademark TEFLON® of the DuPont Company is well known as being applicable to PTFE. In contrast, the DuPont Company sells the PTFE micropowder as ZONYL® fluoroadditive to be used for imparting low surface energy and other fluoropolymer attributes when added to other materials.

The proportions of PFA and LMW PTFE used to make compositions that are heat treated according to the present invention can be varied to obtain the improvement in MIT flex life desired. Preferably the improvement in MIT flex life is at least at least 4× and more preferably at least 10× the MIT flex life of the composition prior to the heat treatment. These degrees of improved flex life are also applicable to comparison with the PFA (not heat treated) by itself. In general, the amount of LMW PTFE to be used in the composition is that which is effective to provide any of these improved flex lives at the heat treatment temperature of at least 280° C. being used. In this regard, the composition will generally contain at least 15 wt %, and preferably, at least 18 wt %, and more preferably at least 20 wt % of the LMW PTFE. The maximum LMW PTFE content will be dictated by the particular application of the composition, and in any event is preferably less than 50 wt %. For all the LMW PTFE minimum contents mentioned above, the preferred maximum amount of LMW PTFE in the composition forming the component is 45 wt %, thereby defining such LMW PTFE content ranges of 15 to 45 wt % and 18 to 45 wt %. On the same basis, the preferred maximum amount of LMW PTFE is 40 wt % and more preferably, 35 wt % and even more preferably 30 wt %, thereby defining such additional ranges as 18 to 40 wt %, 18 to 35 wt %, and 18 to 30 wt % and 20 to 45 wt %, 20 to 35 wt %, and 20 to 30 wt % LMW PTFE. For all these wt % amounts, the PFA constitutes the remaining polymer content to total 100 wt % based on the combined weight of these polymers. Preferably, a single LMW PTFE and a single PFA are used to form the composition to be heat treated, and these are the only polymer ingredients making up the composition. Pigment may be present, that which does not render the composition electrically conductive. The composition and article made therefrom is preferably non-electrically conductive, in which case it will be free of electrically conductive carbon. Preferably the composition has a dielectric constant of no greater than 2.4, more preferably, no greater than 2.2, all measured at 20° C.

The composition is preferably prepared by thorough melt mixing of the PFA and LMW PTFE together in the proportions desired. Melt-mixing as disclosed herein and as the term implies is the heating of the composition above the melting temperature of both components, and subjecting the resultant melt to mixing, such as by stirring the melt, as occurs using the injection or extrusion screw present in injection molding or extrusion, respectively. The shear rate used for the melt mixing will generally be at least about 75 s$^{-1}$.

Prior to melt mixing, the two polymers can be dry blended to form the composition as a dry blended mixture. The form of the polymers for dry blending can be extruded pellets of the PFA and LMW PTFE powder. Typically the pellets will be smaller than 10 mm in diameter and length, and the LMW PTFE powder will have an average particle size less than 50 micrometers as measured by laser microtac equipment.

Upon cooling the molten composition from the melt fabrication process, the PFA and LMW PTFE will crystallize separately as indicated by the composition exhibiting two melting temperatures corresponding approximately to the melting temperatures of the two polymer components. The heat aging of the composition in the solid state as described results in epitaxial co-crystallization (ECC), whereby the composition undergoes a thermal transformation such that the composition exhibits only a single melting temperature. ECC will be further describe in Example 3 Preferably, this higher melting temperature is between the melting temperatures of the PFA and LMW PTFE by themselves, with the melting temperature of the LMW PTFE preferably being greater than the melting temperature of the PFA, e.g. preferably at least 5° C. greater. The compositions are referred to herein as comprising the PFA and the LMW PTFE in the belief that at the molecular level, these two components are present in the composition even after heat aging. The term "comprising" used herein therefore includes the description of the composition as to how it is made, i.e. the composition being made by melt mixing the PFA and LMW PTFE components, followed by melt fabrication and the composition after heat aging to obtain ECC in the belief that at the molecular level, the two polymers are still present.

The melt mixture of the composition can be melt-fabricated into the final form of articles desired for the composition or into extruded pellets of the composition, which can then be melt-fabricated into the final form of the article desired. The melt fabrication process will depend on the article being formed, but will generally use such melt fabrication processes as extrusion, injection molding, transfer molding, compression molding, rotomolding, or blow molding. Examples of such articles include the following unsupported articles: film, sheet, rods, and tubes such as can be used in heat exchangers, pipes, cylinders, vessels, and containers. The article can also be in the form of a modified melt-fabricated article such as convoluted tubing made from extruded tubing. Of particular interest are baskets and carriers and other articles injection molded from the composition, which would be used in chemical processing such as for carrying silicon wafers in semiconductor manufacture.

Preferably, the heat treatment of the composition is of the article such as just described. In other words, after the LMW PTFE is incorporated into the PFA such as by melt mixing, the PFA/LMW PTFE composition is then melt fabricated to form an article, preferably in its final form, followed by the heat treatment described above The time of heat treatment will depend on the temperature of the heat treatment, and vice versa, and the improvement in MIT flex life desired. It can also vary with the size or bulk of the article being heat treated. A thicker-walled article will require a more intense heat treatment that a thinner-walled article. By more intense is meant either a higher temperature of heating exposure or a longer period of time of the exposure or both. In general, the temperature of heat treatment is preferably at least 290° C. and more preferably at least 300° C., and most preferably, at least 310° C. The period of time is a lengthy period of time for heat treatment and is distinguished in this regard from the time expended in the melt fabrication process step to make the article. The heat treatment is also distinguished from melt fabrication in that the upper temperature of heat treatment is less than the melting temperature of the composition. In this regard, the maximum temperature of heat treatment is such that the composition or article made therefrom is in the solid state during heat treatment, which means that the composition/article does not flow and the original shape of the composition or article is still discernible during and after the heat treatment is carried out. Thus, the upper temperature of the heat treatment is such that the article being heat treated remains in the solid state and does not change to the molten state, thereby becoming flowable. The time periods of heat treatment will generally be at least one day. Heating for longer periods of time produces further improvement in MIT flex life, this increase depending on time, e.g. at least 1.25 or 1.5 or 1.75 days, or at least 2 days, or at least 3 days, and even at least 4 days. Each of these heating time can be combined with any of the heating temperatures disclosed herein as the time/temperature condition of the heat exposure. Generally, the heat treatment is carried out in an oven, which may contain air making up the medium enveloping the article. Preferably, the heat treatment is continuous for the period of time of the heat treatment, i.e. uninterrupted.

EXAMPLES

The procedure for measuring MIT Flex Life is disclosed at ASTM D 2176 using an 8 mil (0.21 mm) thick compression molded film unless a different film thickness is specified.

The compression molding of the film used in these tests is carried out on melt-blended compositions made in the Brabender® extruder as described later herein under a force of 20,000 lbs (9070 kg) at a temperature of 343° C. to make 7×7 in (17.8×17.8 cm) compression moldings. In greater detail, to make the 60 mil (1.5 mm) thick plaque, 80 g of the composition is added to a chase which is 63 mil (1.6 mm) thick. This charge overfills the chase cavity, and the chase defines the 17.8×17.8 cm plaque size. To avoid sticking to the platens of the compression molding press, the chase and composition filling are sandwiched between two sheets of aluminum. The combination of the chase and the aluminum sheets (backed up by the platens of the press) form the mold. The press platens are heated to 343° C. The total press time is 10 min, with the first one minute being used to gradually reach the press force of 20,000 lb (9070 kg) and the last minute being used for pressure release. The sandwich is then immediately transferred to a 70-ton (63560 kg) cold press, and 20,000 lb (9070 kg) force is applied to the hot compression molding for 5 min. The sandwich is then removed from the cold press and the compression molded plaque is removed from the mold. The film samples used to determine MIT flex life are made using an 8 mil (0.21 mm) chase and the amount of composition added to the resultant mold is 11.25 g. The film test specimens (samples) are die cut from the molded film using a steel die. The film samples are ½ in (1.27 cm) wide strips cut from the compression molded film.

The LMW PTFE used in the Examples has a heat of crystallization of 64 J/g, melting temperature of 325° C. (second heat) and is a powder having an average particle size of 12 micrometers, and MFR of 17.9 g/10 min. This LMW PTFE cannot be compression molded into film that has sufficient integrity for MIT flex testing.

The PFA used in the Examples is characterized as follows: It is a TFE/PPVE copolymer having an MFR of 14 g/10 min and PPVE content of 4.2 wt %, and a melting temperature (first heat) of 307° C. The end group population of this PFA is mainly —COOH and a small proportion of the total end groups being —COF, i.e. this PFA is not fluorine treated. The PFA is in the form of pellets having no dimension larger than 8 mm.

The procedure for determining melting temperatures disclosed herein is by DSC (differential scanning calorimeter) analysis in accordance with ASTM D3418-08. The calorimeter used is TA Instruments (New Castle, Del., USA) Q1000 model. The temperature scale has been calibrated using (a) 3 metal melting onsets: mercury (−38.86° C.), indium (156.61° C.), tin (231.93° C.) and (b) the 10°/min heating rate and 30 ml/min dry nitrogen flow rate. The calorimetric scale has been calibrated using the heat of fusion of indium (28.42 J/g) and the (b) conditions. The melting temperature determinations are carried out using the (b) conditions. The melting temperatures disclosed herein are the endothermic peak melting temperature obtained from the first or second heating (melting) of the polymer following the heat-up/cool-down/heat-up schedule set forth in U.S. Pat. No. 5,603,999, except that the maximum temperature used is 350° C. The melting temperature of the compositions, before and after heat aging disclosed herein are first heat melting temperatures.

Heat of crystallization (first heat) is determined as disclosed in U.S. Pat. No. 5,603,999.

The blend (melt mixtures) of PFA and LMW PTFE used to make MIT flex test film samples and for other testing reported in these Examples is obtained by the following procedure: A Brabender® single screw extruder is used. The extruder is equipped with a 1¼ in (3.2 cm) diameter screw having a Saxton-type mixing tip and the extruder has an L/D ratio of 20:1. Pellets of the PFA and LMW PTFE powder are dry blended, followed by melt mixing in the Brabender® extruder. The blending is in two steps. In the first step, one-half of the desired total amount of the LMW PTFE is melt mixed with the PFA pellets and then passed through the extruder, which extrudes pellets of this mixture. In the second step, these pellets are dry mixed with the second half (the remainder) of the total amount of LMW PTFE and passed through the Brabender extruder to produce extruded pellets. The temperature profile in the extruder is as follows: zone 1=315° C., zone 2=321° C., zone 3=332° C., zone 4=338° C., zone 5 and die=349° C. The extruder screw is operated at 120 rpm.

Example 1

The composition is 80 wt % of the PFA and 20 wt % of the LMW PTFE, melt blended as described above to form pellets, which are then melted and subjected to MFR determination as described above after heat treatment at 2 temperatures and for increasing periods of time as reported in Table 1.

TABLE 1

| Heat Aging Time (days) | MFR (g/10 min) | |
|---|---|---|
| | 300° C. | 315° C. |
| 0 | 14 | 14 |
| 1 | 9.8 | 6 |
| 2 | 8 | 1.7 |
| 3 | 6.8 | 1.1 |
| 4 | 5.9 | 1.1 |
| 5 | 3.6 | 1 |
| 6 | 2.8 | 1 |
| 7 | 2 | 1 |

The MFR of the composition decreases with increased heat aging. The decrease is much greater for the composition heat aged at 315° C. In addition, the effect of the heat aging of the composition at 315° C. in the first 2 days is much greater than for the 300° C. heat-aged composition, i.e. the decrease in MFR is much sharper. Thereafter the MFR for the 315° C. heat-aged composition tends to level out with increasing exposure time, while the 300° C. heat-aged composition continues its more gradual decrease in MFR with increasing exposure time. After heat treatment at 315° C. for 25 days, the MFR deceases to 0.6 g/10 min.

Preferably, the heat aging is effective to cause at least 50%, preferably at least 60%, reduction in the MFR of the unaged composition.

Example 2

The composition of Example 1 is subjected to MIT flex life testing after heat treatment at 315° C. for increasing periods of time as reported in Table 2.

TABLE 2

| No. of days | Film Thickness (mm) | MIT flex life (cycles) |
|---|---|---|
| 0 | 0.28 | 3695 |
| 1 | 0.22 | 5693 |
| 2 | 0.30 | 18550 |
| 3 | 0.29 | 29525 |
| 6 | 0.26 | 55770 |
| 7 | 0.25 | 65955 |

As indicated in Table 2, there is a trend of increasing MIT flex life with increased heat treatment time. This increase is at least 5× upon 2 days heat treatment (calculation: 18550÷3695), and at least 8× upon 3 days heat treatment. This trend continues with additional heat treatment. After 25 days of heat treatment at 315° C., the MIT flex life is 86777 cycles (0.28 mm film thickness).

The MIT flex life for the PFA by itself is 8500 cycles (film thickness 0.23 mm). As is seen from Table 2, the addition of the LMW PTFE to this PFA results in a decreased MIT flex life until after 2 days of heat treatment, the MIT flex life is much greater than that for the PFA by itself and for the PFA/LMW PTFE composition with no heat treatment. The improvement over the PFA by itself is more than 2×, especially in view of the greater film thickness of the 2-day aged test sample as compared to the thinner film of the PFA by itself. Typically the addition of LMW PTFE to PFA in accordance with the present invention results in a decrease in MIT flex life compared to the PFA by itself. The subsequent heat aging restores this loss of flex life and even greatly improves it.

While the MFR decrease reported in Table 2 essentially levels out after 2 days of heat treatment, as compared to the sharp decrease in MFR in from 0 to 2 days heating, the MIT flex life keeps increasing upon aging for two days and longer, e.g. at least for 3 days.

The heat aged composition has a single melting temperature (first heat) of 320° C. and a dielectric constant of less than 2.2.

Example 3

Epitaxial Co-crystallization

In addition to the decrease in MFR resulting from heat aging shown in Example 1, the heat aging also causes a solid state crystallographic transformation, called epitaxial co-crystallization (ECC). This transformation is the blend of separate crystals of PFA and LMW PTFE in the melt-fabricated article become co-crystals of these polymer components. The manifestation of ECC is that the heat aged composition/article exhibits a single DSC melting temperature (first heat). In contrast, the composition/article prior to heat aging, even after melt fabrication exhibits two melting temperatures corresponding approximately to the melting temperature of each polymer component.

ECC is the phenomenon in these separate crystals becoming co-crystals such that the DSC first heat melting temperature is a single melting temperature, which is greater than the melting temperature of the PFA, and indicating that the crystals of PFA and LMW PTFE have transformed to a different crystalline state, namely co-crystals.

ECC occurs in the present invention by heat aging at a temperature at which the PFA/LMW PTFE composition does not flow and retains its shape, i.e. the composition is in the solid state. The shape of the melt-fabricated article is discernible after heat aging. This is important so that the melt-fabricated article retains it melt fabricated shape during and after heat aging. Thus, while the heat aging temperature is high, such temperature is not so high that the solid state composition/article changes to the molten state, which would result in melt flow and loss of original shape. It has been found that this shape stability is retained even at heat aging temperatures greater than the melting temperature of the PFA by itself. It is preferred, however, that the heat aging temperature be less than the melting temperature of the lowest melting temperature component of the composition, i.e. less than the melting temperature of the PFA.

Melt fabrication of the PFA/LMW PTFE composition does not produce ECC. By this is meant the melt-fabricated composition/article exhibits two melting temperatures corresponding approximately to that of the PFA and LMW PTFE components as shown by the following testing. The composition tested is 25 wt % LMW PTFE (earlier described) and 75 wt % PFA having an MFR of 5.2 g/10 min, PPVE content of 3.7 wt %, a melting temperature (first heat) of 306° C. and end group population (not fluorinated) as described of for the PFA earlier in these Examples. The starting material is this composition in the form of pellets prepared using the Brabender® single screw extruder as described above.

DSC analyses of the pellets reveals the presence of two endothermic peaks at approximately 315° C. and 322° C., indicating the presence of separate crystals primarily of the PFA and LMW PTFE in the melt-fabricated pellets of the composition.

Re-extrusion of the pellets through a Kombiplast® extruder having a screw design for thorough melt blending of the components of the composition and DSC analysis of the extrudate reveals approximately the same two melting temperatures (312° C. and 320° C.) for the unaged composition.

Heat aging of the extrudate for 1 day at 300° C. followed by DSC analysis reveals a single melting temperature for the composition, 319° C. It has been determined that at least about 12 hr heat aging at 300° C. is required before an essentially single melting temperature is exhibited by the composition.

The re-extrusion of the unaged composition is repeated 6 times and the resultant unaged extrudate for each extrusion is subjected to DSC analysis, the result being the presence of two melting peaks within the range of 313° C.-314° C. and 321° C.-322° C. Heat aging at 300° C. for 1 day of the unaged extrudate from each of these 6 re-extrusions reveals a single DSC melting peak (melting temperature) within the range of 318° C. to 319° C.

The extrudate remains solid and the shape of the extrudate remains discernible even after this heat aging, i.e. the heat aging of the composition is carried out with the extrudate in the solid state.

The invention claimed is:

1. Process for improving the MIT flex life of tetrafluoroethylene/perfluoro(alkyl vinyl ether) copolymer, said perfluoroalkyl containing from 1 to 5 carbon atoms, comprising incorporating at least 15 wt % melt flowable polytetrafluoroethylene into said copolymer and thereafter heat treating the resultant composition in the solid state at a temperature of at least 280° C. to increase the flex life of said composition by at least 2× the flex life of said copolymer prior to said heat treatment.

2. Process of claim 1 wherein the amount of said melt flowable polytetrafluoroethylene is 15 to 35 wt % based on the total weight of said composition.

3. Process of claim 1 wherein said heat treatment is carried out at for at least 24 hr.

4. Process of claim 1 wherein said heat treatment is carried out at a temperature of at least 300° C. for at least 2 days.

5. Process of claim 1 wherein the effect of the incorporation of said polytetrafluoroethylene into said copolymer on said flex life prior to said heat treatment is to decrease said flex life of said composition.

6. Process of claim 1 wherein said resultant composition is melt fabricated into an article and it is said article that is subjected to said heat treatment.

7. Process of claim 1 wherein the melt flow rate of said copolymer is at least 5 g/10 min.

8. Process of claim 1 wherein the melt flow rate of said copolymer is at least 6 g/10 min.

9. Process of claim 8 wherein the melt flow rate of said copolymer is no greater than 50 g/10 min.

10. Process of claim 2 wherein said heat treatment is carried out for at least 24 hours.

11. Process of claim 1 wherein said heat treatment is carried out at a temperature of at least 310° C.

12. Process of claim 1 wherein the amount of said melt flowable polytetrafluoroethylene is at least 18 wt % based on the total weight of said composition.

13. Process of claim 12 wherein the amount of said melt flowable polytetrafluoroethylene is at least 20 wt % based on the total weight of said composition.

14. Process of claim 1 wherein the amount of said melt flowable polytetrafluoroethylene is no more than 50 wt % based on the total weight of said composition.

* * * * *